US008043748B2

(12) United States Patent
Geng et al.

(10) Patent No.: US 8,043,748 B2
(45) Date of Patent: Oct. 25, 2011

(54) PASTED NICKEL HYDROXIDE ELECTRODE FOR RECHARGEABLE NICKEL-ZINC BATTERIES

(75) Inventors: Mingming Geng, San Diego, CA (US); Samaresh Mohanta, San Diego, CA (US); Jeffrey Phillips, La Jolla, CA (US); Zeiad M. Muntasser, San Diego, CA (US); Jeff Barton, San Diego, CA (US)

(73) Assignee: PowerGenix Systems, Inc., San Diego, CA (US)

( * ) Notice: Subject to any disclaimer, the term of this patent is extended or adjusted under 35 U.S.C. 154(b) by 361 days.

(21) Appl. No.: 12/365,658

(22) Filed: Feb. 4, 2009

(65) Prior Publication Data

US 2009/0202904 A1 Aug. 13, 2009

Related U.S. Application Data

(60) Provisional application No. 61/065,079, filed on Feb. 7, 2008.

(51) Int. Cl.
*H01M 10/26* (2006.01)
*H01M 4/13* (2010.01)
*H01M 10/24* (2006.01)

(52) U.S. Cl. ......................... 429/223; 429/231; 429/206

(58) Field of Classification Search ........................ None
See application file for complete search history.

(56) References Cited

U.S. PATENT DOCUMENTS 3,647,544 A 3/1972 Schneider
3,870,564 A 3/1975 Takamura et al.
3,951,687 A 4/1976 Takamura et al.
3,961,985 A 6/1976 Takamura et al.
4,003,754 A 1/1977 Winsel et al.
4,017,665 A 4/1977 Sandera et al.
5,215,836 A 6/1993 Eisenberg
5,523,182 A 6/1996 Ovshinsky et al.
5,804,334 A 9/1998 Yamamura
5,968,684 A 10/1999 Hayashi et al.
(Continued)

FOREIGN PATENT DOCUMENTS

EP 0833397 4/1976
(Continued)

OTHER PUBLICATIONS

Ohta et al., "Nicel Hydroxide Electrode: Improvement of Charge Efficiency at High Temperature," The Electrochemical Society Proceedings, vol. 94-27, pp. 296-302, 1994.

(Continued)

*Primary Examiner* — Barbara Gilliam
*Assistant Examiner* — Angela Martin
(74) *Attorney, Agent, or Firm* — Weaver Austin Villeneuve & Sampson LLP

(57) ABSTRACT

Active material for a positive electrode of a rechargeable alkaline electrochemical cell is made with nickel hydroxide particles or cobalt-coated nickel hydroxide particles treated with strongly oxidizing reagents such as alkali metal persulfate in alkaline solution. The active material also may be made with cobalt-coated nickel hydroxide particles having a high percentage of cobalt(III) on a surface or an average cobalt oxidation state of about 3 measured across the particles. The treated nickel hydroxide or cobalt-coated nickel hydroxide decreases the cobalt solubility in the alkaline electrolyte and increases the high-rate charge and discharge capability. The lower cobalt solubility decreases cobalt migration that can increase self discharge and lead to premature failure.

7 Claims, 11 Drawing Sheets

U.S. PATENT DOCUMENTS

| | | | | |
|---|---|---|---|---|
| 6,040,007 | A * | 3/2000 | Junichi et al. | 427/215 |
| 6,225,004 | B1 | 5/2001 | Hayashi | |
| 6,436,575 | B1 | 8/2002 | Weckesser et al. | |
| 6,617,072 | B2 | 9/2003 | Venkatesan et al. | |
| 6,649,305 | B1 | 11/2003 | Bugnet et al. | |
| 6,787,265 | B2 | 9/2004 | Phillips | |
| 7,261,972 | B2 | 8/2007 | Inada et al. | |
| 7,829,221 | B2 | 11/2010 | Phillips | |
| 2002/0037455 | A1* | 3/2002 | Tani et al. | 429/223 |
| 2002/0172758 | A1 | 11/2002 | Nanno et al. | |
| 2003/0140483 | A1 | 7/2003 | Wakabayashi et al. | |
| 2004/0115533 | A1 | 6/2004 | Phillips | |
| 2005/0003270 | A1 | 1/2005 | Phillips | |
| 2006/0029863 | A1 | 2/2006 | Miyamoto et al. | |
| 2009/0208839 | A1 | 8/2009 | Geng et al. | |

FOREIGN PATENT DOCUMENTS

| | | | |
|---|---|---|---|
| EP | 0457354 | | 11/1991 |
| EP | 0697746 | | 2/1996 |
| EP | 0 902 490 | | 3/1999 |
| EP | 1 172 869 | | 1/2002 |
| EP | 1207576 | | 5/2002 |
| EP | 1 367 666 | | 12/2003 |
| EP | 1 699 099 | | 9/2006 |
| EP | 902490 | B1 * | 11/2008 |
| EP | 1168471 | | 1/2011 |
| JP | 54163324 | | 12/1979 |
| JP | 56-29345 | | 7/1981 |
| JP | 07037609 | | 2/1995 |
| JP | 11297352 | | 10/1999 |
| JP | 200058062 | | 2/2000 |
| JP | 2005 056 733 | | 3/2005 |

OTHER PUBLICATIONS

Canada Office Action dated Apr. 30, 2008, from corresponding Canadian Patent Application No. 2,325,640.

International Search Report mailed Apr. 29, 2002, PCT Application PCT/UCA01/01717.

Japan Office Action dated Feb. 22, 2008, from corresponding Japan Patent Application No. 2002-541747, with English explanation from Japanese Associate of Office Action.

Japan Abstract, dated Feb. 25, 2000, from Japan Patent Application No. 2002-058062.

Office Action dated Dec. 10, 2007 for U.S. Appl. No. 10/899,593.

Final Office Action dated Apr. 11, 2008 for U.S. Appl. No. 10/899,593.

Office Action dated Jun. 30, 2008 for U.S. Appl. No. 10/899,593.

"WordNet Search." WordNet. Dec. 3, 2008. <http://wordnet.princeton.edu/perl/webwn?s=embedded>.

"WordNet Search." WordNet. Dec. 3, 2008. <http://wordnet.princeton.edu/perl/webwn?s=paste>.

"WordNet Search." WordNet. Apr. 4, 2008. <http://wordnet.princeton.edu>.

Office Action dated Dec. 4, 2008 for U.S. Appl. No. 10/899,593.

Office Action dated Mar. 6, 2009 for U.S. Appl. No. 10/899,593.

CA Office Action dated Apr. 14, 2009, from CA Appl. No. 2,325,640.

EP Office Action dated Dec. 2, 2009, from EP Appl. No. 01993957.8.

JP Office Action dated Sep. 8, 2009, from JP Appl. No. 2002-541747, with English explanation from Japanese Associate of Office Action.

US Notice of Allowance dated Nov. 19, 2009, from related U.S. Appl. No. 10/899,593.

US Notice of Allowance dated Feb. 2, 2009, from related U.S. Appl. No. 10/899,593.

U.S. Appl. No. 10/899,593, filed Jul. 26, 2004.

Search Report and Written Opinion dated May 13, 2009 for corresponding PCT Application No. PCT/US2009/033265.

Ying et al., "Surface modification of nickel hydroxide particles by micro-sized cobalt oxide hydroxide and properties as electrode materials," *Surface and Coatings Technology*, Elsevier, Amsterdam, NL, vol. 200, No. 7, (Dec. 21, 2005), pp. 2376-2379, XP005181204.

Search Report and Written Opinion dated Jun. 22, 2010 for PCT Application No. PCT/US2010/033023.

US Notice of Allowance dated Jun. 14, 2010, from related U.S. Appl. No. 10/899,593.

US Notice of Allowance dated Sep. 23, 2010, from related U.S. Appl. No. 10/899,593.

US Office Action dated Apr. 5, 2011 issued in U.S. Appl. No. 12/432,639.

* cited by examiner

PASTED NICKEL HYDROXIDE ELECTRODE FOR RECHARGEABLE NICKEL-ZINC BATTERIES

CROSS-REFERENCE TO RELATED APPLICATIONS

This application claims priority under U.S.C. §119 to provisional application 61/065,079, titled "Pasted Nickel Hydroxide Electrode For Rechargeable Nickel-Zinc Batteries," filed on Feb. 7, 2008, the disclosure of which is incorporated herein in its entirety for all purposes.

FIELD OF INVENTION

This invention pertains generally to nickel-zinc batteries. More specifically, this invention pertains to the composition and manufacturing methods for a positive nickel electrode.

BACKGROUND

The recent trend for portable devices, such as power tools, has increased the needs and requirements for high power and high energy density rechargeable batteries. The nickel hydroxide electrode has been used as the positive electrode in high power and high energy nickel-metal hydride batteries, nickel-cadmium batteries and nickel-zinc batteries. The pasted nickel hydroxide electrode typically includes nickel hydroxide, cobalt powder, nickel powder and binding materials. The cobalt compound is included to increase the conductivity of the nickel electrode. However, the same cobalt compound causes detrimental effects if it migrates to the negative electrode.

As power and energy density requirements increase, positive nickel electrode composition and manufacturing methods that produces a low-impedance and long-life battery continues to be sought.

SUMMARY OF THE INVENTION

Active material for a positive electrode of a rechargeable alkaline electrochemical cell is made with nickel hydroxide particles or cobalt-coated nickel hydroxide particles treated with strongly oxidizing reagents such as alkali metal persulfate in alkaline solution. The active material also may be made with cobalt-coated nickel hydroxide particles having a high percentage of cobalt (III) on their surface or an average cobalt oxidation state of about 3, or about 3-3.25 measured across the particles.

According to various embodiments, the methods of the present invention improves manufacturability of the rechargeable electrochemical cell by allowing more time to lapse, from less than about one hour to about 24 hours, between filling the assembled cell with electrolyte and cell formation charge. To make the positive electrode, an alkali metal hydroxide solution, a strong oxidizing agent, and a nickel hydroxide or a cobalt-coated nickel hydroxide powder are mixed. Any unreacted oxidizing agent is separated from the treated powder, which is used to prepare an active material paste. The paste is then incorporated into a nickel electrode.

Generally, the strong oxidizing agent may be a persultate, a perchlorate, ozone, or a permanganate. The strong oxidizing agent may be an alkali metal persulfate such as sodium persulfate or potassium persulfate. The treated nickel hydroxide or cobalt-coated nickel hydroxide decreases the cobalt solubility in the alkaline electrolyte and increases the high-rate charge and discharge capability. The lower cobalt solubility decreases cobalt migration that can increase self discharge and lead to premature failure. Thus the treatment results in better battery performance at high-rate charge and discharge, better shelf-life, and lower probability of premature failure.

In another aspect, the present invention pertains to a nickel-zinc cell incorporating a nickel oxide positive electrode having cobalt-coated nickel oxide particles with highly oxidized cobalt on most of the surface. Highly oxidized cobalt has an oxidation state of about 3 or higher or about 3 to 3.25. In certain embodiments, more than 90% or more than 95% of the surface cobalt has an oxidation state of about 3 or higher. According to various embodiments, the average oxidation state of all cobalt in the particles, including surface and embedded cobalt, is about 3 or greater. The cobalt concentration in the zinc oxide negative electrode may be less than about 30 ppm or less than about 10 ppm. The zinc electrode gassing rate after formation may be less than about 1 ml/hr after the formation charge. The residual capacity of fully charged cells after a simulated year of storage at room temperature may be greater than about 30%. Generally, these cells have higher conductive and lower impedance than cells that did not incorporate highly oxidized cobalt.

These and other features and advantages are discussed further below with reference to associated drawings.

DETAILED DESCRIPTION OF THE PRESENT INVENTION

Figure 1:
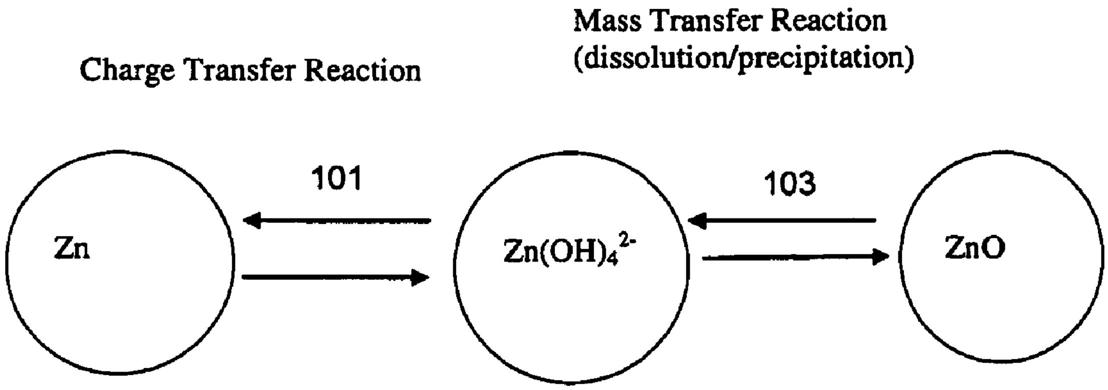
FIG. 1 is a diagram of the charge transfer and mass transfer reactions in the Zn electrode in the nickel-zinc cell.

Embodiments of the present invention are described herein in the context of manufacturing a positive nickel electrode and the context of a positive nickel electrode active material for a nickel-zinc cell. Those of ordinary skill in the art will realize that the following detailed description of the present invention is illustrative only and is not intended to be in any way limiting. Other embodiments of the present invention will readily suggest themselves to such skilled persons having the benefit of this disclosure. For example, the highly oxidized cobalt oxide incorporated in a positive nickel electrode may be formed using other oxidizing chemistries.

Reference will be made in detail to implementations of the present invention as illustrated in the accompanying drawings. In this application, the terms "battery" and "cell" may be used interchangeably, such use should be clear from the context of the discussion.

Introduction

The present invention provides electrodes for use in nickel-zinc rechargeable battery cells. In certain embodiments, the positive electrode includes nickel hydroxide particles having a coating of highly oxidized cobalt. One way to obtain the highly oxidized cobalt coating is to treat cobalt-coated nickel hydroxide particles with a strongly oxidizing agent. The resulting rechargeable cells of the present invention possess one or more of the following characteristics: long shelf life, long cycle life, high conductivity, low impedance, high power density, and suitability for high rate applications.

Conventional positive nickel electrodes include cobalt particles in the active material. The cobalt particles may be provided as cobalt metal or cobalt oxide. The inventors have appreciated that dissolved cobalt may migrate from the positive electrode during the first charge or formation process of the electrochemical cell. This migration removes cobalt from the nickel electrode, in which cobalt provides part of the conductive matrix responsible for maintaining low electrode and cell impedance. Since this diffusion process is temperature and time dependent and has a significant impact on various performance parameters, the variability that can exist in a fill and formation process can result in individual cells with excessive variability and less than optimal impedance values. Variations that affect the distribution and passage of current in the formation process can exert a profound effect upon the Amp hour capacity, shelf discharge and capacity maintenance of the cell over its charge—discharge lifetime. Such consequences of cell variations within battery packs can significantly decrease cycle life of a cell pack.

Sealed rechargeable Ni—Zn batteries have been developed for high power applications, such as power tools and hybrid electric vehicles. These batteries show exceptional high-rate charge and discharge capability with maximum power densities in excess of 2000 W/kg. The effects of soluble cobalt species can have a particularly detrimental effect on this type of battery. The migration of soluble cobalt species from the positive electrode to the negative zinc electrode reduces amount of cobalt in the positive electrode, and consequently less cobalt forms the conductive matrix during the formation process. The reduction in the conductive matrix results in lower conductivity and higher impedance for the battery. A direct effect of this contamination on the zinc electrode is an acceleration of the rate of hydrogen evolution during both the operation and the storage of the battery. This can result in cell imbalance in multi-cell batteries and may promote the occurrence of dendritic shorts that can result in catastrophic failures.

Alkaline electrolytes have been developed to eliminate the zinc dendritic growth but their effectiveness may be reduced in the presence of cobalt contamination. These alkaline electrolytes in the context of rechargeable Ni—Zn batteries are disclosed in U.S. Patents Publication US20060127761, titled "Electrolyte Composition For Nickel-Zinc Batteries" by Jeffrey Phillips.

The charging process for a nickel hydroxide positive electrode in an alkaline electrochemical cell is governed by the following reaction:

$$Ni(OH)_2+OH^- \rightarrow NiOOH+H_2O \quad (1)$$

The charging efficiency of the positive electrode and the utilization of the positive electrode materials are affected by the oxygen evolution process which is controlled by the reaction:

$$2OH^- \rightarrow H_2O+\tfrac{1}{2}O_2+2e^- \quad (2)$$

The oxygen evolution reaction generally begins when the state-of-charge (SOC) reaches to 70~80%. The overcharge of the nickel electrode leads to a decrease of the charging efficiency of the nickel electrode as more charge is diverted to gas evolution. After first charge of the electrochemical cell, the nickel hydroxide is oxidized to form the nickel oxy hydroxide. During discharge of the electrochemical cell, the nickel oxyhydroxide is reduced to form nickel hydroxide. The reversible nickel hydroxide should maintain in a beta-phase structure, but generally, the nickel electrode undergoes some degradation by swelling in the thickness as the number of charge/discharge cycles increases.

Alkaline electrolyte acts as ion carrier in the electrochemical reaction in the Zn electrode. In the rechargeable Zn electrode, the starting active material is the ZnO powder or a mixture of zinc and zinc oxide powder. The ZnO powder dissolves in the KOH solution to form the zincate ($Zn(OH)_4^{2-}$) that is reduced to zinc metal during the charging process. The reaction at the Zn electrode can be written as follows:

$$ZnO+2OH^-+H_2O \rightarrow Zn(OH)_4^{2-} \quad (3)$$

and $$Zn(OH)_4^{2-}+2e^- \rightarrow Zn+4OH^- \quad (4)$$

Then, the overall Ni/Zn battery reaction can be expressed as follows:

$$Zn+2NiOOH+H_2O=ZnO+2Ni(OH)_2 \quad (5)$$

The charge transfer and mass transfer reactions in the Zn electrode is also shown in FIG. 1. In the discharging process of the Zn electrode, the zinc metal gives out electrons to form zincate, shown as reaction 101. At the same time, the concentration of the zincate in the KOH solution increases. The increase in the zincate concentration leads to a precipitation of zincate to form the ZnO, shown as reaction 103. These transformations and agglomerations that occur at the zinc electrode are major factors in the eventual loss in activity of the electrode over many charge discharge cycles. Some of the improvements in Ni—Zn battery technology to eliminate the zincate growth in the separator are disclosed in the U.S. Patents Publication US20060127761, titled "Electrolyte Composition For Nickel-Zinc Batteries" by Jeffrey Phillips, and U.S. Patent Publication US20060207084, titled "Method of Manufacturing Nickel Zinc Batteries" by Jeffrey Phillips.

The Cobalt Stabilization Process

Figure 2:
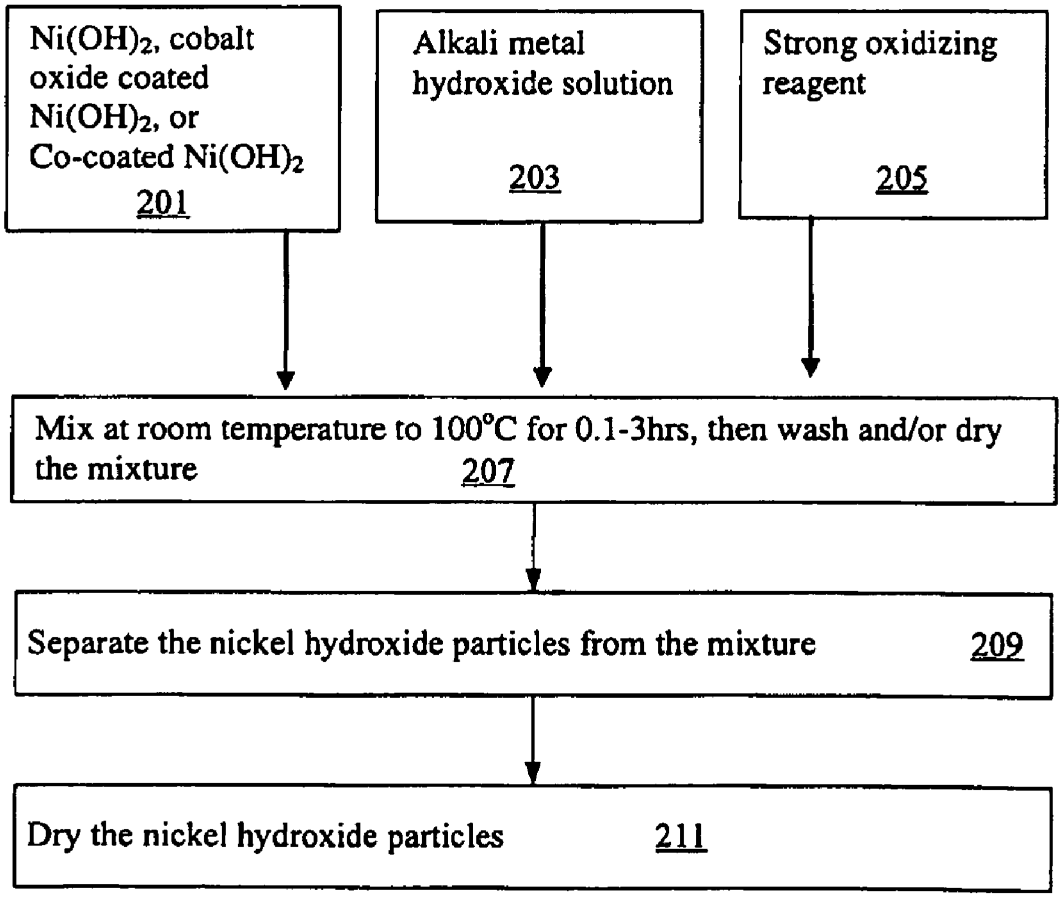
FIG. 2 is a process flow diagram of a cobalt stabilization process according to various embodiments in accordance with the present invention.

Nickel hydroxide or cobalt-coated nickel hydroxide may be treated to prevent the cobalt from dissolving in the alkaline electrolyte and migrating to the negative electrode before the formation process. Note that uncoated nickel hydroxide also includes some cobalt and when treated using this process, the cobalt also becomes highly oxidized. In this procedure, nickel hydroxide particles, an alkali metal hydroxide solution, and a strong oxidizing reagent are mixed. The reactants may be added in any order as shown in FIG. 2.

The nickel hydroxide particles, shown as element 201, may be uncoated or coated with cobalt or cobalt oxide. They may also contain some amounts of nickel oxyhydroxide. In some embodiments, the particles are provided from co-precipitation of cobalt oxide and nickel hydroxide. The cobalt compound may be distributed throughout the nickel hydroxide matrix in the particle or be limited to the surface as a coating. Regardless of composition, the nickel hydroxide particles may be provided in various sizes such as powders, granules, etc. Each nickel hydroxide particle contains nickel hydroxide and some cobalt. Coated and uncoated nickel hydroxide powders suitable for battery use is commercially available from various companies such as Changsha Research Institute (CRI) in P. R. China and Tanaka Chemical Corporation in Japan. The powder size from such sources typically ranges from about 0.5 μm to 10 μm.

The interaction with alkali metal hydroxide, shown as element 203, renders the surface of the nickel hydroxide or Co-coated nickel hydroxide particles alkaline. The alkali metal hydroxide may be, for example, sodium, potassium or lithium hydroxide in an aqueous solution. Thus, the surface of the nickel hydroxide particles may incorporate potassium, sodium or lithium alkali metals. The strong oxidizing reagent, shown as element 205, is then added while maintaining the temperature between about 20 and 100 degrees Centigrade. The oxidizing reagent may be, for example, a persulfate salt, a perchlorate salt, a permanganate salt, ozone, and the like. The salts are typically, though not necessarily, sodium or potassium salts. Typical concentrations for the mixture are: between about 3 wt. % and 5 wt. % persulfate and between about 5 wt % and 30 wt. % hydroxide. A typical reaction involving sodium persulfate and sodium hydroxide is as follows:

$$xNa_2S_2O_8+2Co(OH)n+2xNaOH \rightarrow 2xNa_2SO_4+2Co(OH)_{n+x}$$

Sodium persulfate and sodium hydroxide react with the cobalt on the nickel hydroxide or cobalt that is incorporated in the uncoated nickel hydroxide to form sodium sulfate and oxidized cobalt hydroxide. The result is that the cobalt becomes more oxidized to a valence of "x" greater than its starting valence. It is believed that a cobalt coating on nickel hydroxide (or cobalt incorporated in a nickel hydroxide matrix) as provided by typical commercial sources has a valence of between about 2 and about 3. While not wishing to be bound by theory, it is believed that after treatment with a strong oxidizing agent such as sodium persulfate, the oxidation state of all cobalt in the nickel hydroxide increases to at least 3 and possibly more than 3. It is believed that the oxidation state after the treatment may become about 3 to 3.5, e.g., about 3.2 or about 3.0. It is believed that cobalt(II) is soluble while cobalt(III) is not soluble.

In certain embodiments shown as element 207, mixing is continued for about 0.1 to 3 hours at between about 20 and 100 degrees Centigrade to ensure the reaction completes before the nickel hydroxide particles are separated from the mixture. The mixing temperature may be about 20 to 100° C. The separation 209 may include several steps. First, the reaction products are washed with distilled water. The excess water may be decanted from the mixing vessel. In operation 211, the resulting nickel hydroxide may be dried some more before use in the actual positive electrode paste operation. In another embodiment, the mixture may be filtered first before it is washed with distilled water or another suitable washing solution.

In certain embodiments, the pasted nickel hydroxide electrode is made using a mixture of the cobalt-stabilized nickel hydroxide powder, cobalt powder, nickel powder, CMC and PTFE (an example of a binder). The active material paste is forced into a nickel foam and pressed to form a nickel electrode plate.

Figure 3:
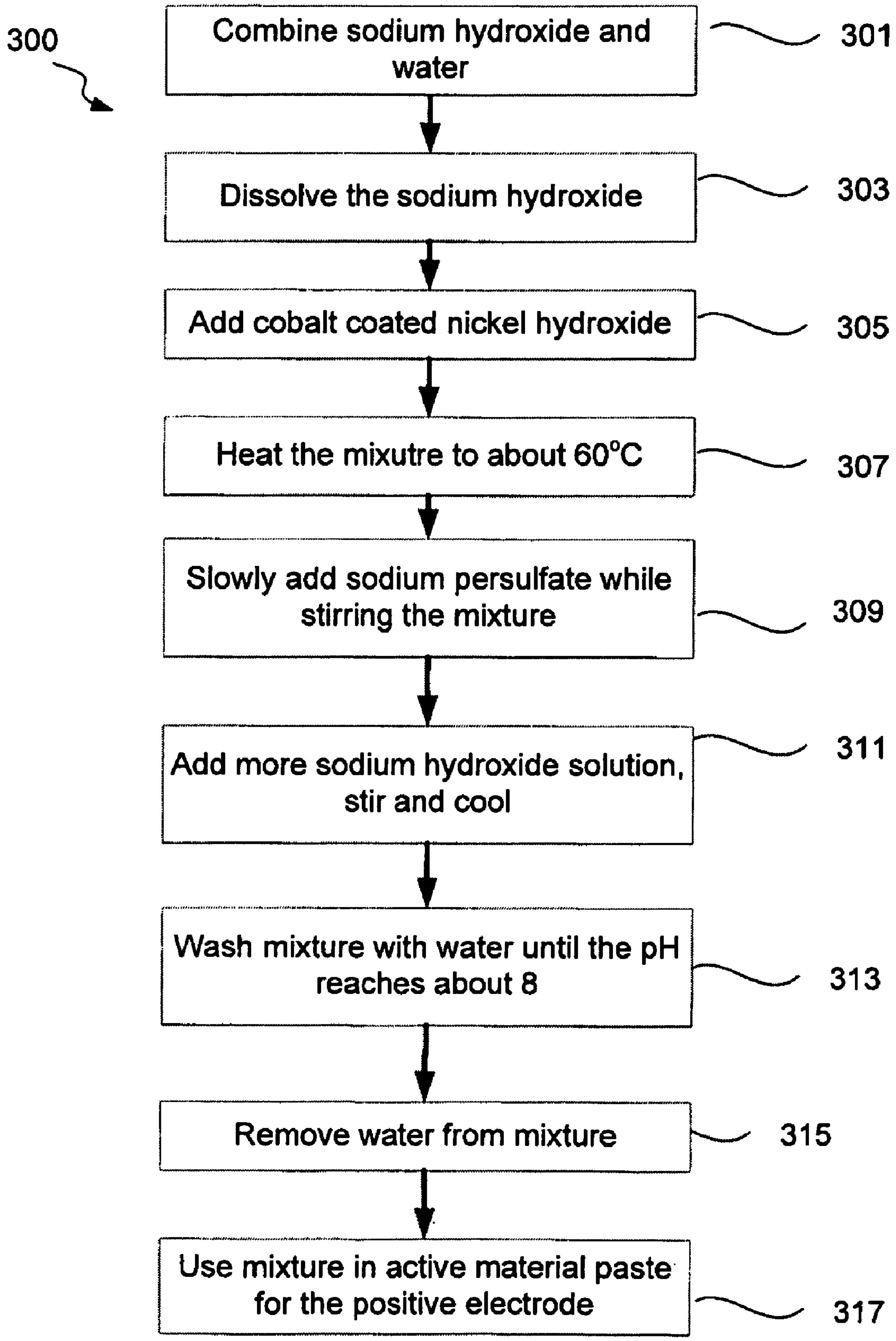
FIG. 3 is a process flow diagram of a cobalt stabilization process according to various embodiments in accordance with the present invention.

In another example of the cobalt stabilization process depicted in FIG. 3, sodium hydroxide and water are combined in a container in operation 301. This mixture is stirred to dissolve the sodium hydroxide in operation 303. In one embodiment, 38 g of NaOH and 800 g of $H_2O$ are used. Then, cobalt coated nickel hydroxide is added to the container in operation 305 and stirred until it is in suspension. In one embodiment, about 1900 g of cobalt coated nickel hydroxide is added. The container is then heated to about 60° C. in operation 307 with occasional stirring. Then, sodium persulfate is slowly added to the heated mixture while the mixture is stirred in operation 309. In one embodiment, 70 g of sodium persulfate is added. The amount of strongly oxidizing agent may be calculated based on the amount and known oxidation states of various components. For example, enough sodium persulfate may be added to oxidize all cobalt to an oxidation state of 3 or more. Stirring continues for some time, e.g., about 30 minutes. More sodium hydroxide solution is then added in operation 311. In one case, 59 g of NaOH solution, including 9 g of NaOH and 50 g of $H_2O$ are used. The stirring may continue periodically for some time, e.g., 1.5 hours. The mixture may be allowed to cool to room temperature. In operation 313, the mixture may be washed with water, e.g., distilled water, until the pH reaches about 8. During the washing, the container may be decanted a few times, e.g., 3-6 times. As much water as possible is then removed from the mixture without drying the mixture in operation 315. The amount may be weighed and the total water content calculated. The amount of water calculated to be present in the treated mixture may then be reduced from the positive electrode paste recipe. The treated mixture is then used to create the active material paste for the positive electrode in operation 317.

Although the preceding example uses sodium persulfate, other strongly oxidizing agents may be used. Note that one benefit of the above process is that all unwanted reaction products are in solution and may be washed away using only water. The separation process is easily monitored by checking the pH. Thus an oxidizing agent that forms a precipitating reaction product would be undesirable, because separating the nickel hydroxide from the reaction product would be more difficult. The relative amounts of materials may be adjusted up or down based on the material selected and the total desired product quantity. The stirring times in the example above are illustrations only and do not limit how this process may be practiced. More or less stirring and other agitating methods may be used. Additionally, the treated nickel hydroxide may be wet or dry. For manufacturing purposes, the wet product incorporates into an active material paste easily, but dry, treated nickel hydroxide may be used for the active material paste if available in non-agglomerated form. In certain embodiments, the treated nickel hydroxide is kept wet until incorporation into the active material paste.

The Positive Electrode

The positive electrode generally includes an electrochemically active nickel oxide or hydroxide and one or more additives to facilitate manufacturing, electron transport, wetting, mechanical properties, etc. For example, a positive electrode formulation may include the treated nickel hydroxide particles from the cobalt stabilization process described above, zinc oxide, cobalt oxide (CoO), cobalt metal, nickel metal, and a flow control agent such as carboxymethyl cellulose (CMC). Note that the metallic nickel and cobalt may be chemically pure or alloys.

According to various embodiments, the positive electrode formulation may include nickel oxide particles and highly oxidized cobalt. The nickel oxide particle and the highly oxidized cobalt may be formed on the same particle, e.g., through a co-precipitation process or precipitating the cobalt onto nickel oxide particles. Thus, the highly oxidized cobalt may be coated on the nickel oxide surface or be embedded in the nickel oxide matrix. The nickel oxide matrix may include about 2% cobalt by weight, up to 10% cobalt by weight or about 2-4% cobalt by weight. The surface cobalt may be about 1% to 6%, greater than about 2%, about 4%, or greater than 6% by weight. Of the surface cobalt, about 90%, greater than 90% or greater than 95% of the surface cobalt may be highly oxidized. Highly oxidized cobalt has an oxidation state of about 3 or greater than 3, about 3 to 3.25, or greater than 3.25. In some examples, the average oxidation state of all the cobalt in or on the nickel oxide particles may be about 3, at least 2.8 or at least 2.9.

A nickel foam matrix is preferably used to support the electroactive nickel (e.g., $Ni(OH)_2$) electrode material. In one example, commercially available nickel foam by Inco, Ltd. may be used. The diffusion path to the $Ni(OH)_2$ (or other electrochemically active material) through the nickel foam should be short for applications requiring high discharge rates. At high rates, the time it takes ions to penetrate the nickel foam is important. The width of the positive electrode, comprising nickel foam filled with the $Ni(OH)_2$ (or other electrochemically active material) and other electrode materials, should be optimized so that the nickel foam provides sufficient void space for the $Ni(OH)_2$ material while keeping the diffusion path of the ions to the $Ni(OH)_2$ through the foam short. The foam substrate thickness may be may be between 15 and 60 mils. In a preferred embodiment, the thickness of the positive electrode, comprising nickel foam filled with the electrochemically active and other electrode materials, ranges from about 16-24 mils. In a particularly preferred embodiment, positive electrode is about 20 mils thick.

The density of the nickel foam may be optimized to ensure that the electrochemically active material uniformly penetrates the void space of the foam. In a preferred embodiment, nickel foam of density ranging from about 300-500 $g/m^2$ is used. An even more preferred range is between about 350-500 $g/m^2$. In a particularly preferred embodiment nickel foam of density of about 350 $g/m^2$ is used. As the width of the electrode layer is decreased, the foam may be made less dense to ensure there is sufficient void space. In a preferred embodiment, a nickel foam density of about 350 $g/m^2$ and thickness ranging from about 16-18 mils is used.

Experimental

For comparison purposes six battery cells were made using different nickel positive electrodes made with or without the cobalt stabilization treatment. After the cells were made and formation completed (initially charged), they were subjected to various tests. During the formation, voltage was measured over time. 24 hours after the formation, various electrical properties were measured, such as open circuit voltage, impedance, and capacity. Then outgassing was measured in open cells. Atomic absorption tests were conducted to measure cobalt level in the negative electrodes. Finally, the cells were charged and cycled to measure cell life.

All of the cells had a capacity of 1.90 Ah at a 2 A discharge current. All of the cells had identical electrolyte and zinc negative electrode and were made using the same recipe and process. Three cells were made using treated particles, and three using non-treated particles. For each of these three cell sets, one cell was made using uncoated nickel hydroxide, and two were made using nickel hydroxide coated with cobalt oxide. Out of the two using cobalt coated nickel hydroxide, one had an electrolyte soak time of one hour, and the other had an electrolyte soak time of 24 hours.

The electrolyte soak time is time between the filling of the cells with electrolyte and the application of the first charging current. Using the cobalt-stabilized nickel material the time may be extended from about 1 hour to 24 hours without detrimental effect. This electrolyte soak time is important to the manufacturing process flow. Having a larger time window between the filling of the cells and the application of the first charging current increases work flow flexibility and reduces performance variations of cells processed in different batches having slightly different electrolyte soak times. In battery packs, the charge/discharge performance of the entire pack is strongly dependent on the worst performing cell. Thus cells having similar performances are grouped for a battery pack to maximize performance for the entire pack. Increasing this process time window reduces the variability of cells and increases the ease of this grouping.

The electrolyte composition is 760 g $H_2O$, 1220 g 45% potassium hydroxide solution, 84.7 g sodium phosphate ($Na_3PO_4.12H_2O$), 59 g Sodium hydroxide, 16.8 g Lithium hydroxide, 3.2 g Zinc oxide (ZnO). The nickel hydroxide particle contains 4 wt. % zinc and 1.5 wt. % cobalt in lattice. The cobalt-coated nickel hydroxide contains 3% cobalt on the surface of the nickel hydroxide.

The nickel-zinc sub-C size cell was made according to following processes.

Cell A: The nickel hydroxide powder was treated using persulfate in alkaline solution. The positive electrode was pasted using 4 wt. % cobalt powder, 9 wt. % nickel powder, 0.4 wt. % CMC and 0.2 wt. % PTFE. Note that the nickel hydroxide powder includes some cobalt in lattice. The "soak" time was 1 hour. The sodium persulfate is used as the oxidation agent. The operation temperature is 40° C. The mixing time is 2 hrs.

Cell B is made according to following processes: Untreated nickel hydroxide powder was used as the positive active materials. The positive electrode was pasted using 4 wt. % cobalt powder, 9 wt. % nickel powder, 0.4 wt. % CMC and 0.2 wt. % PTFE. The "soak" time was 1 hour.

Cell C is made according to following processes: The CoOOH-coated nickel hydroxide powder was treated using persulfate in alkaline solution. The positive electrode was pasted using 2 wt. % cobalt powder, 9 wt. % nickel powder, 0.4 wt. % CMC and 0.2 wt. % PTFE. The "soak" time was 1 hour.

Cell D is made according to following processes: The CoOOH-coated nickel hydroxide powder was treated using persulfate in alkaline electrolyte solution. The positive electrode was pasted using 2 wt. % cobalt powder, 9 wt. % nickel powder, 0.4 wt. % CMC and 0.2 wt. % PTFE. The "soak" time was 24 hours.

Cell E is made according to following processes: The non-treated CoOOH-coated nickel hydroxide powder was used as the positive electrode active materials. The positive electrode was pasted using 2 wt. % cobalt powder, 9 wt. % nickel powder, 0.4 wt. % CMC and 0.2 wt. % PTFE. The "soak" time was 1 hour.

Cell F is made according to following processes: The non-treated CoOOH-coated nickel hydroxide powder was used as the positive electrode active materials. The positive electrode was pasted using 2 wt. % cobalt powder, 9 wt. % nickel powder, 0.4 wt. % CMC and 0.2 wt. % PTFE. The "soak" time was 24 hours.

Figure 4A:
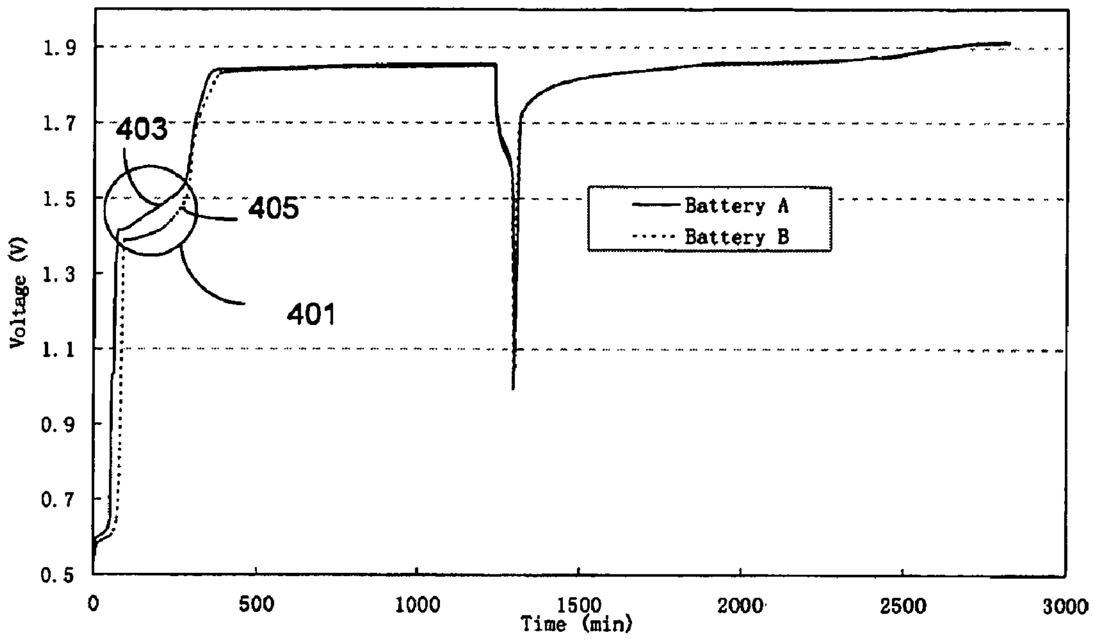
FIG. 4A to 4C are formation curve for Cells A to F.

The formation of all cells listed above was carried out identically. Formation of cells refers to the initial electrical charging. Each cell was charged at 91 mA for 20.5 hrs and discharged at 1 A to 1.0 V. Then they were charged at 0.1 A for 18 hrs and at 0.075 A for 6.5 hrs. The formation curves and formation data for cells A, B C, D, E and F are shown in FIGS. 4A, B and C and Table 1. Table 1 also summarizes the differences in the positive electrodes between the cells. The cell open circuit voltages (OCV) and impedances were tested 24 hrs after the formation completed.

FIG. 4A shows the formation charging curve for cells A (shown as 403) and B (shown as 405). Note that in the first about 100-300 minutes, the curve includes a shoulder (shown in a circle 401), where the voltage increase slows down. After passing this shoulder (sometimes referred to as a "cobalt wave"), the voltage increases rapidly to about 1.85 V. This "shoulder" represents the oxidation of cobalt II to cobalt III. After all the cobalt II is converted to cobalt III, the main electrochemical reaction, i.e. that of equation (1) above resumes. In the circle 401, a difference in the size of the shoulder is apparent between treated cell A (403) and untreated cell B (405).

Figure 4B:
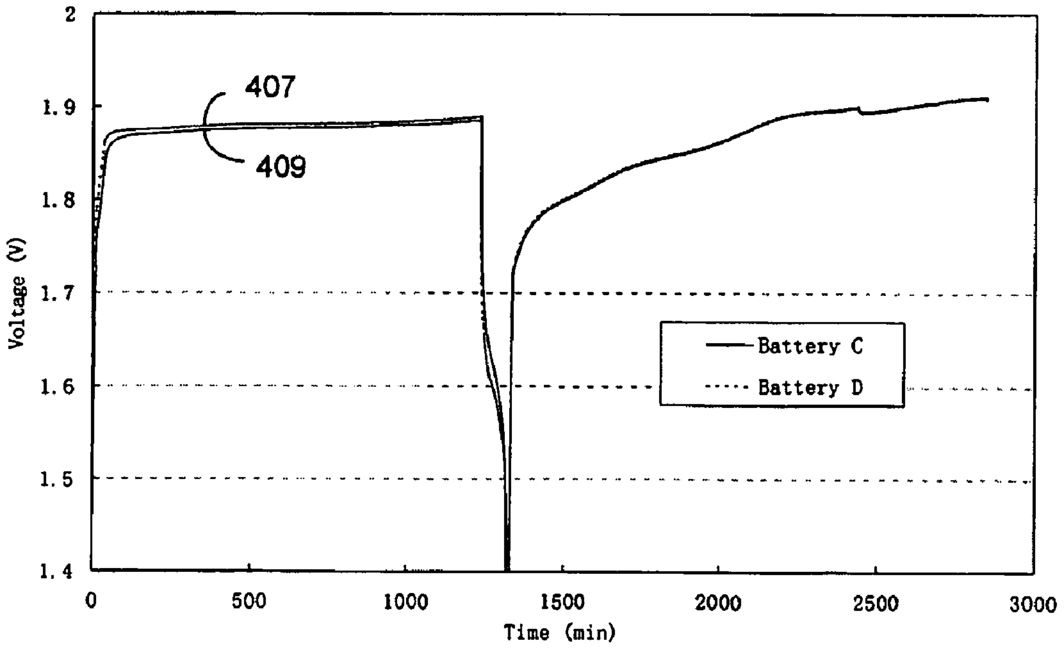

Note that in FIG. 4B, the treated cells C (407) and D (409) do not show this wave. Though not intending to be bound by this theory, it is believed that the cobalt treatment described herein oxidizes some or all cobalt in the nickel hydroxide particles to a valence of III or higher and this highly oxidized cobalt in turned oxidizes metal cobalt in the positive electrode to valence III, thereby reducing or eliminating the cobalt II to cobalt III wave in FIG. 4B. Because the cobalt stabilization treatment increases the treated cobalt valence to above 3, the free cobalt or cobalt compounds added as powder during the paste making process are rapidly oxidized not only by the charging process, but also by the cobalt in the treated nickel hydroxide. As mentioned, it is believed that cobalt(II) is soluble while cobalt(III) is not soluble. Consequently the oxidation process of this invention reduces the solubility of cobalt in the positive electrode, effectively locking it in place. The locked-in place cobalt of treated cell forms a conductive network after formation that is believed to result in higher conductivity and lower impedance of the cell.

Although cell A was also treated, it did not start with a cobalt coated nickel hydroxide, hence much less cobalt exists in the nickel hydroxide prior to treatment and the improvements from oxidation are less dramatic. FIG. 4A does support the theory in that the treated cell A has a smaller shoulder than the untreated cell B.

Figure 4C:
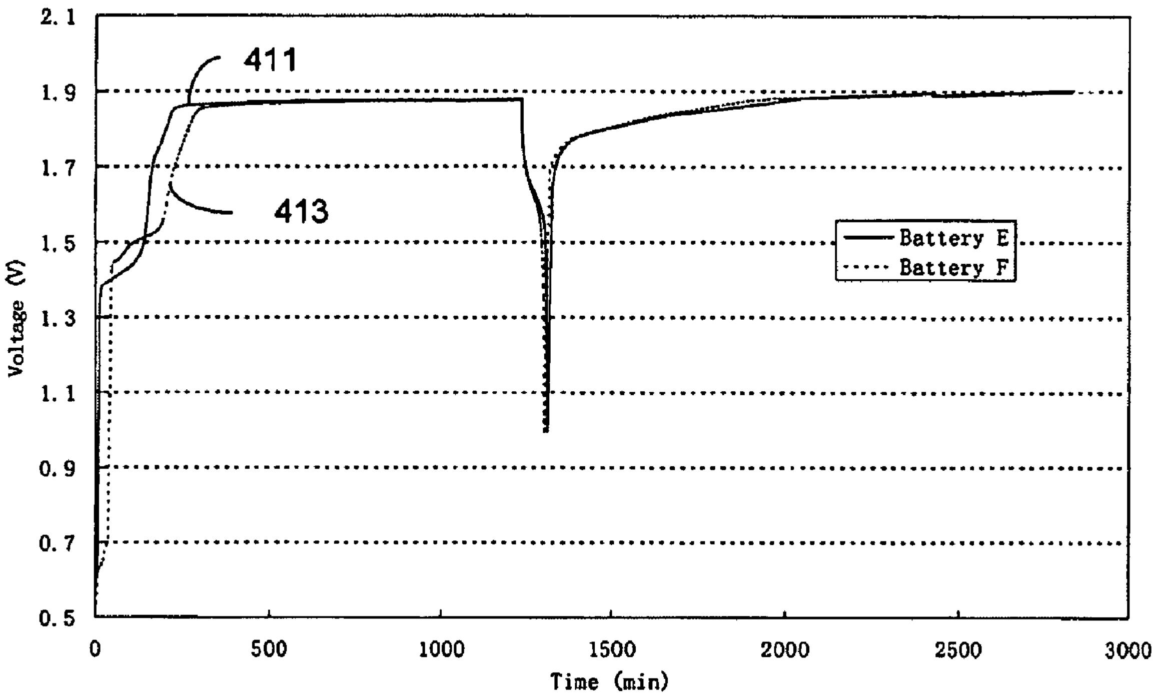

In FIG. 4C, the difference between one hour (cell E, line 411) and 24 hour (cell F, line 413) electrolyte soak suggests that some of the cobalt present in the positive electrode after one hour has migrated away after 24 hours, because the shoulder is deeper (more cobalt oxidizations) for line 411.

TABLE 1

Cell specification and formation data

| Cell | Type of Nickel Particle | Cobalt Stabilization Treatment | Soak time | OCV (V, 24 hrs rest after formation) | Impedance at 1000 Hz (mΩ, 24 hrs rest after formation) | Capacity (Ah) |
|---|---|---|---|---|---|---|
| A | $Ni(OH)_2$ | Yes | 1 hour | 1.825 | 3.83 | 1.051 |
| B | $Ni(OH)_2$ | No | 1 hour | 1.821 | 4.52 | 0.987 |
| C | CoOOH-coated $Ni(OH)_2$ | Yes | 1 hour | 1.825 | 3.84 | 1.456 |
| D | CoOOH-coated $Ni(OH)_2$ | Yes | 24 hours | 1.820 | 3.84 | 1.458 |
| E | CoOOH-coated $Ni(OH)_2$ | No | 1 hour | 1.800 | 3.72 | 1.259 |
| F | CoOOH-coated $Ni(OH)_2$ | No | 24 hours | 1.790 | 4.12 | 1.110 |

The effect of a prolonged transition period between electrolyte fill and formation charge is also shown by comparing the open circuit voltage and impedances of cells E and F in Table 1. After a 24 hour "soak," values of the open circuit voltage were lower and the impedances were higher than those associated with the normal 1 hour "soak". The lower open circuit voltage indicates a higher self discharge and inferior shelf life for cell F, as compared to cell F. Though not intending to be bound this theory, the higher impedance value may be associated with the loss of conductive cobalt or cobalt oxide from the positive electrode. Table 2 compares the cobalt levels detected by Atomic Absorption in the negative electrodes of cells A-F. It is believed that higher amount of cobalt in the negative electrode corresponds to a larger loss of conductive cobalt oxide from the positive electrode. The longer "soak" time increases the cobalt levels in the negative electrode from 50 to 100 ppm. The same table shows the gas released after formation from an open cell at 60° C. over a period of 5 hours. Gas chromatography showed that most of the released gas is hydrogen. Though not intending to be bound by this theory, the larger hydrogen presence may indicate that the cobalt contamination has a direct effect on the corrosion rate of the zinc electrode. Treated cells C and D have the lowest cobalt concentration in the negative zinc electrode (and consequently the lowest hydrogen gassing rate).

The data shows that the persulfate treatment of nickel hydroxide benefits the self discharge performance and impedance of cells with cobalt coated and uncoated nickel hydroxide powder. The beneficial effect is more pronounced for the cell built with cobalt coated nickel hydroxide. The data also shows that extending "soak" time from 1 hour to 24 hours appears not to have a major impact on cell performance for the treated cells C and D, though it does a great deal for untreated cells E and F in terms of cobalt concentration in the negative electrode. Although the gassing volume and cobalt concentration after 24 hours of "soak" time of cell D is greater than that of cell C, they are still much less than that of the untreated cells E and F, regardless of how long the "soak" time was. Thus, the persulfate treatment allows the extended "soak" time that provides two major benefits. First, more time between electrolyte filling and formation promotes uniform electrolyte distribution within the cell before it is charged. Second, a longer soak period in mass production allows for a larger manufacturing window to transfer cells from filling stations to formation stations. This feature of the invention is particularly beneficial in a manufacturing environment where short "soak" periods between the fill and formation of cells present logistical problems.

TABLE 2

Cell gassing data at 60° C. for 5 hrs and cobalt in zinc electrode (post-formation cells)

| Cell | Gassing volume at 60° C. (ml/hr) | Cobalt concentration in zinc electrode (ppm) |
|---|---|---|
| A | 1.0~1.2 | 20~30 |
| B | 1.0~1.2 | 20~30 |
| C | 0.5~0.7 | ~5 |
| D | 0.7~1.0 | 5~10 |
| E | 1.2~1.5 | ~50 |
| F | 1.5~2.0 | ~100 |

High rate cycling tests were conducted at room temperature for the cells A-F. All cells were charged at 2 A to a constant voltage of 1.9V. This voltage was maintained to end-of-charge current of 90 mA before discharging at 10 A to an end-of-discharge voltage of 1.0V. A 20 A discharge was imposed to end-of-discharge of 1.0V at cycling number of $8^{th}$, $56^{th}$, $106^{th}$, $156^{th}$, etc. Discharging at 10 A and 20 A is high rate discharge consistent with use of high-power tools such as circular saws. Table 3 shows the time lapsed for the various cells to reach a voltage of 1.9V at a charging current of 2 A. The treated cells (A, C, and D) charge more efficiently to this voltage level for both the cobalt coated and non cobalt coated nickel hydroxide positive electrodes.

TABLE 3

Cell charging time at 2 A charge current and charging voltage to 1.9 V

| Battery | Charging time (2 A, to 1.9 V) | Charging efficiency (2 A, to 1.9 V) |
|---|---|---|
| A | 49 min | 86% |
| B | 41 min | 72% |
| C | 45 min | 79% |
| D | 44 min | 77% |
| E | 38 min | 67% |
| F | 32 min | 56% |

Figure 5A:
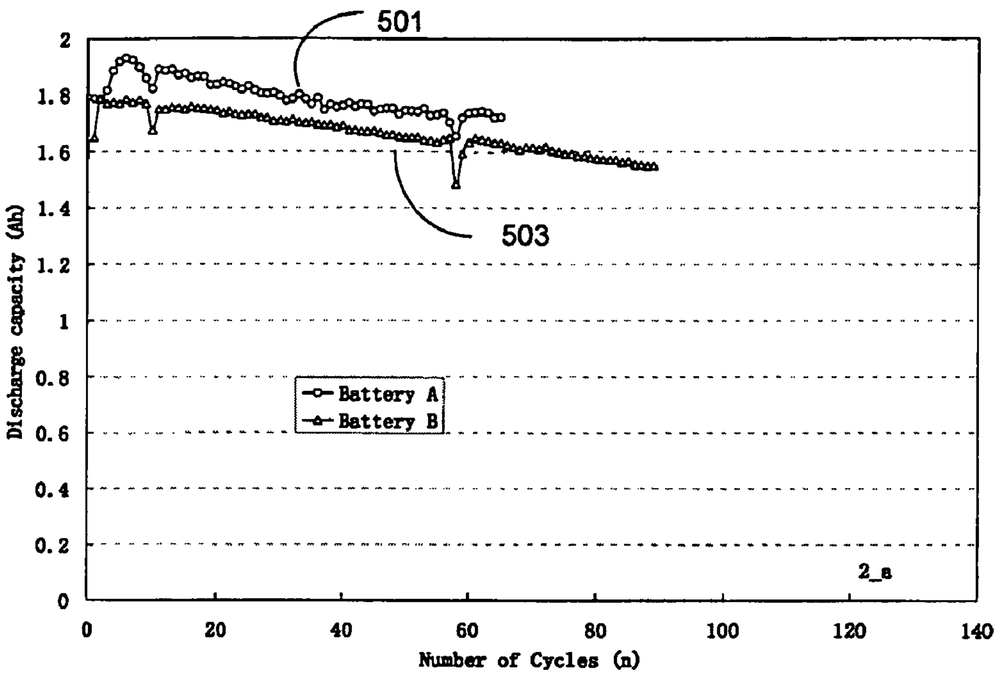
FIG. 5A to 5C are discharge capacity plots for Cells A to F.
Figure 5B:
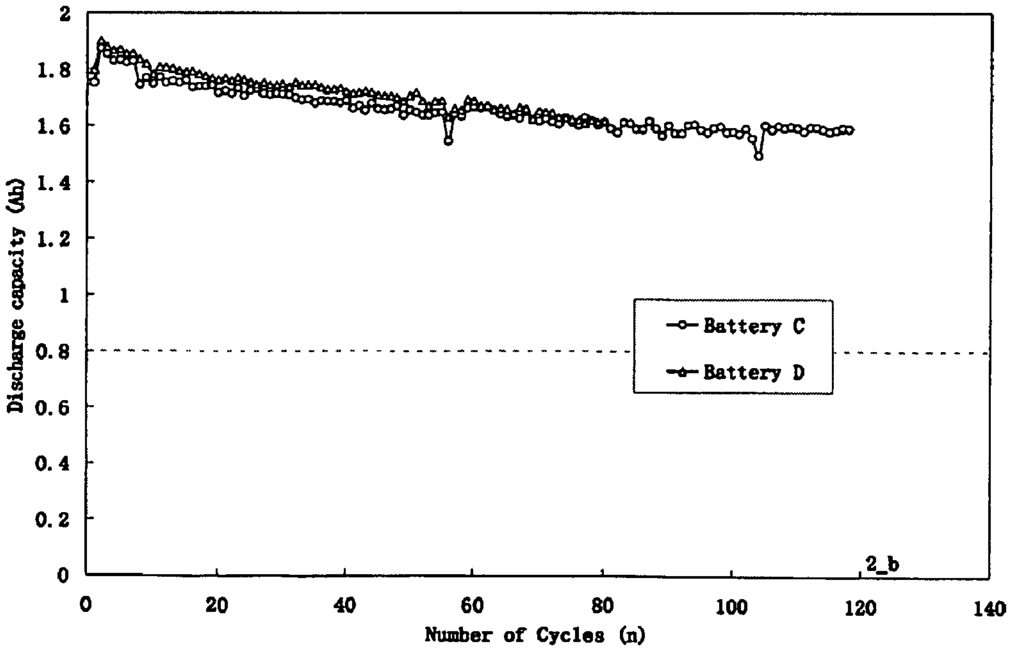
Figure 5C:
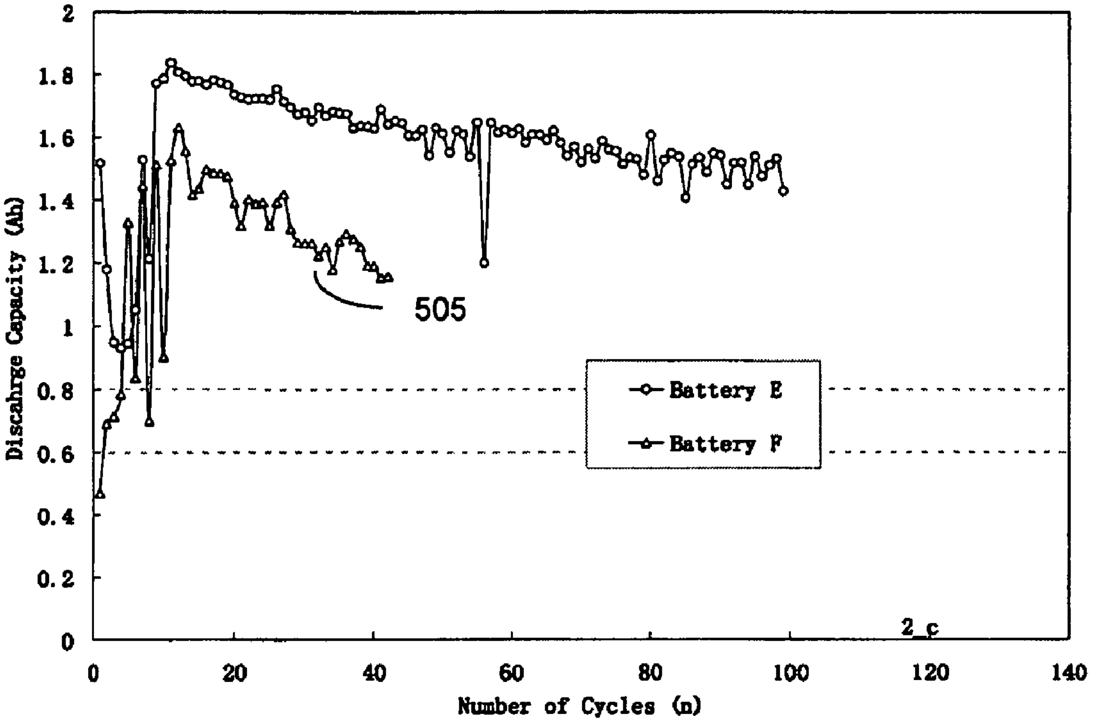

FIGS. 5A, B and C show the discharge capacity as a function of the number of cycles for cells A to F. The persulfate treatment increases the available capacity form the uncoated nickel hydroxide electrode as indicated in FIG. 5A by the 100 mAh enhancement of cell A (501) over cell B (503). FIG. 5B indicates that after persulfate treatment cells containing cobalt coated nickel hydroxide can be "soaked" for 24 hours without any detrimental effect on their cycling capacity. However in contrast the untreated cells (cell F, 505) in FIG. 5C were unable to cycle after a similar extended "soak" time. The high cobalt concentration in the negative zinc electrode appears to reduce the ability of the cell to maintain capacity as the cell is cycled.

Figure 6:
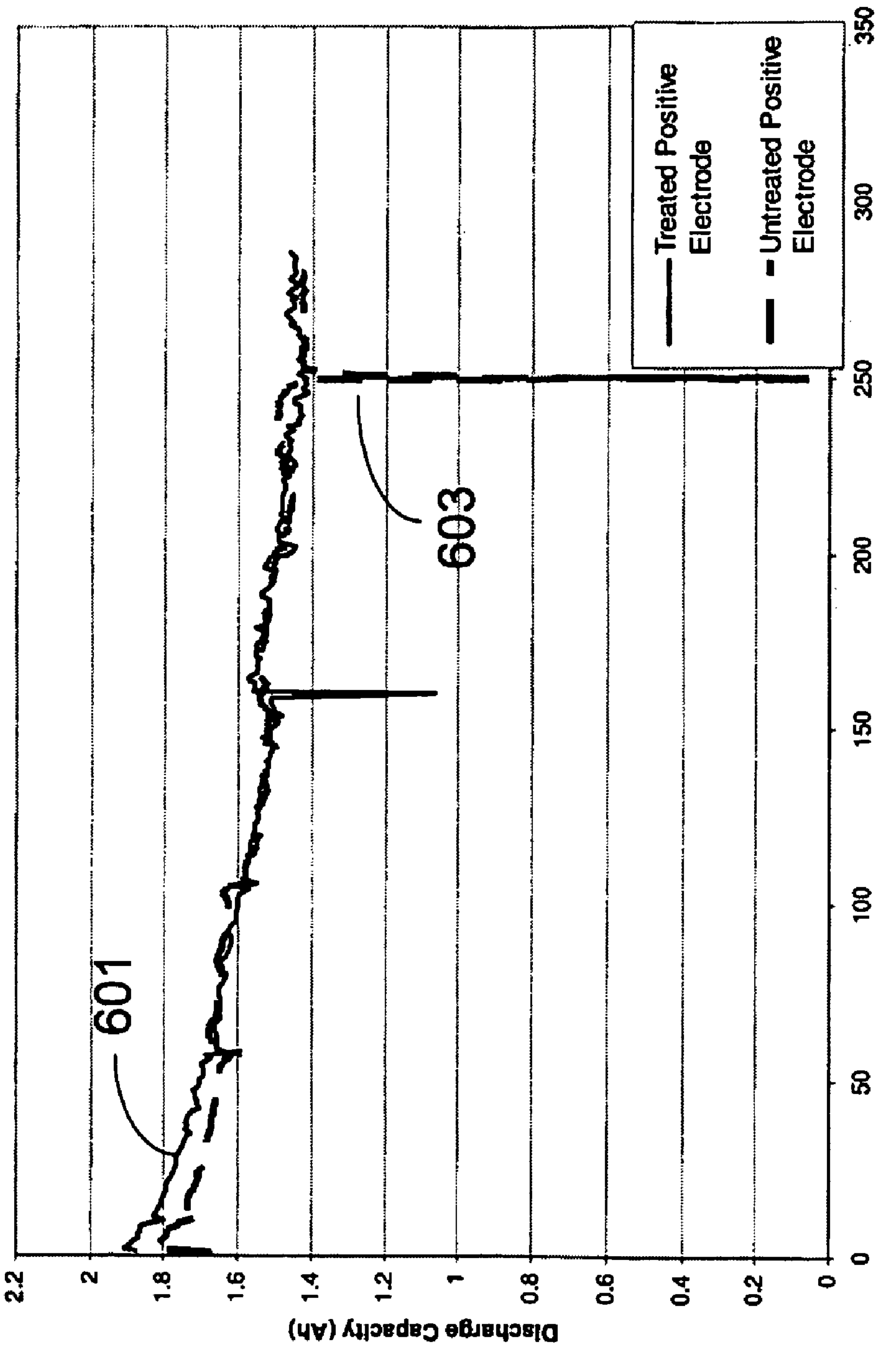
FIG. 6 is a chart showing high rate cycling of treated and untreated cells.

Another comparison of the high rate cycling behavior of cells built with treated and untreated positive electrodes is shown in FIG. 6. In this comparison, two cells were fabricated and their impedance measured during high rate discharge cycles. The treated cell (601) was similar to cell C in the previous example. The untreated cell (603) had identical raw materials but was not subjected to the cobalt stabilization treatment. Both cells were allowed to soak for 1 hour before initiating the formation charge. The treated cell had slightly higher initial capacity but after 50 cycles the cells appeared to behave in an equivalent manner as might be expected when soak times are short enough to inhibit the transference of cobalt to the negative electrode. Nevertheless cobalt levels of the negative electrode on such untreated cells can reach levels of 20-30 ppm by weight depending on the efficacy of the fill process and the ambient temperature. The result is higher self discharge of the negative electrode and inferior shelf life at those cobalt levels in the negative electrode.

Figure 7:
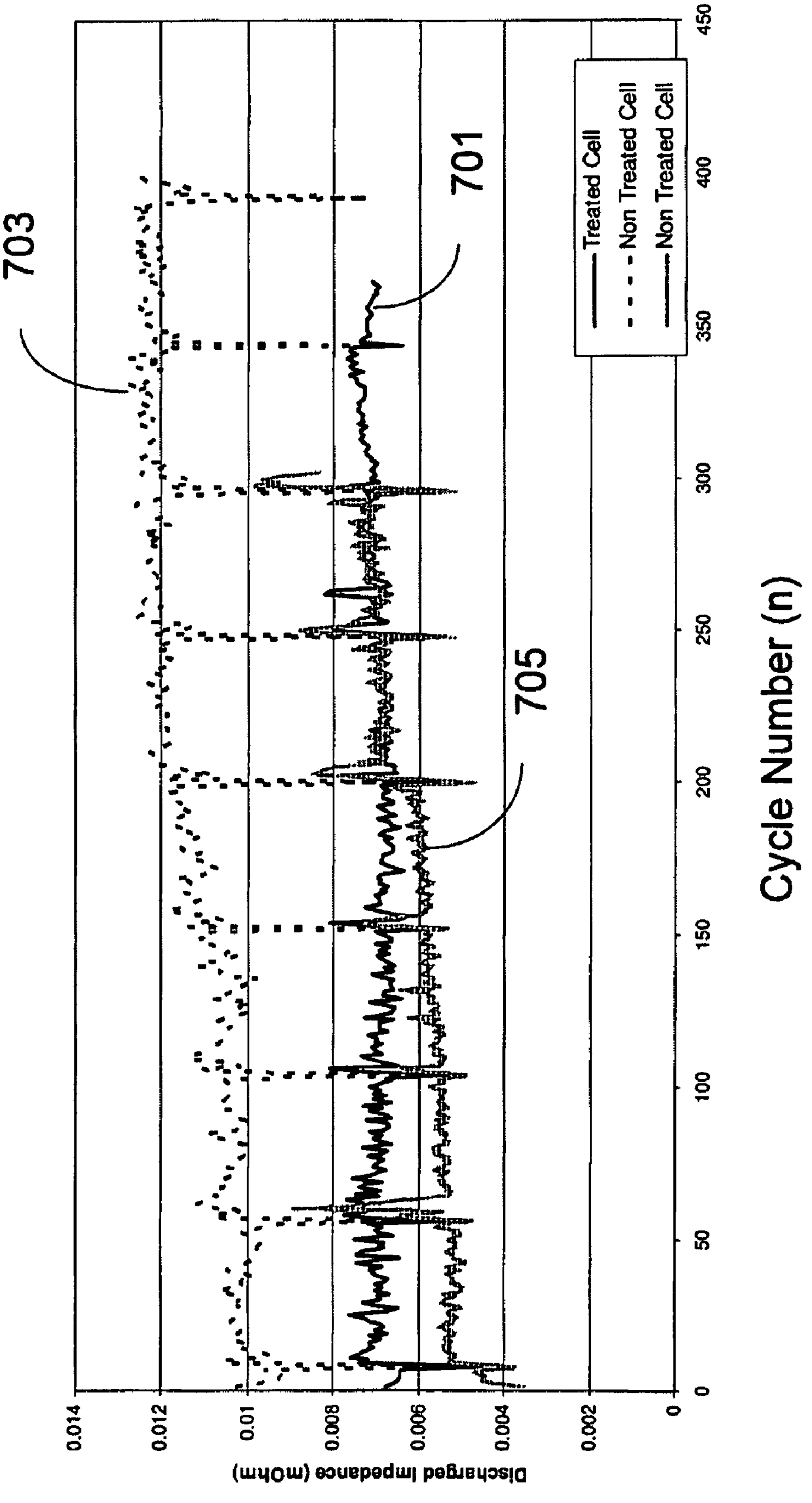
FIG. 7 is a plot showing impedance behavior during high rate cycling for treated and untreated cells.

Impedance values measured after discharge as cells are continuously cycled under high rate conditions described above also show the superiority of cells built with treated positives electrode material (FIG. 7). Three cells were fabricated and cycled. FIG. 7 shows a much more stable impedance over the cycle life for the treated cell 701 over untreated cells 703 and 705 that signifies a much more consistent user experience and implies a much more stable chemistry within the cell.

General Cell Structure

In order to frame the context of this invention, a general battery cell structure suitable for practicing the present invention is described below. This battery cell structure also describes generally the test cells from the experimental data above.

Figure 8A:
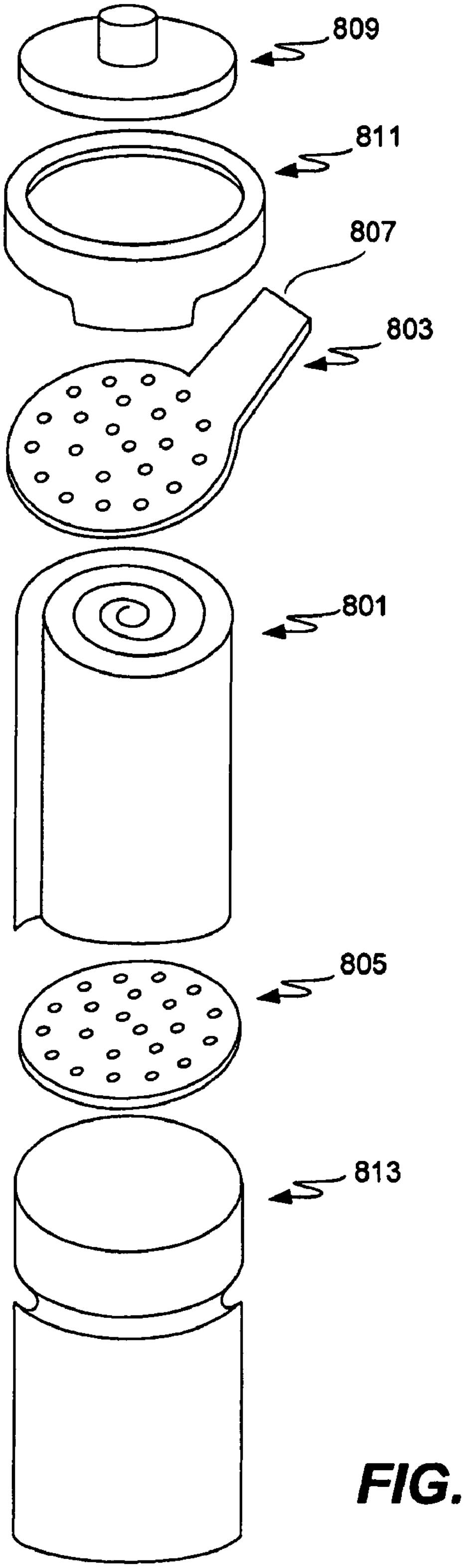
FIG. 8A is an exploded diagram of a nickel zinc battery cell suitable for practicing the present invention.
Figure 8B:
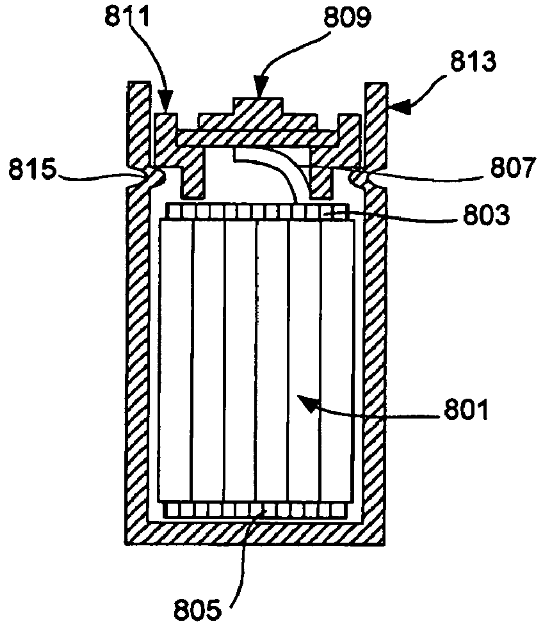
FIG. 8B is a diagrammatic cross-sectional view of an assembled nickel zinc battery cell suitable for practicing the present invention.

FIGS. 8A and 8B are graphical representations of the main components of a cylindrical power cell, with FIG. 8A showing an exploded view of the cell. Alternating electrode and electrolyte layers are provided in a cylindrical assembly 801 (also called a "jellyroll"). The cylindrical assembly or jellyroll 801 is positioned inside a can 813 or other containment vessel. A negative collector disk 803 and a positive collector disk 805 are attached to opposite ends of cylindrical assembly 801. The negative and positive collector disks function as internal terminals, with the negative collector disk electrically connected to the negative electrode and the positive collector disk electrically connected to the positive electrode. A cap 809 and the can 813 serve as external terminals. In the depicted embodiment, negative collector disk 803 includes a tab 807 for connecting the negative collector disk 803 to cap 809. Positive collector disk 805 is welded or otherwise electrically connected to can 813. In other embodiments, the negative collector disk connects to the can and the positive collector disk connects to the cap.

The negative and positive collector disks 803 and 805 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution.

A flexible gasket 811 rests on a circumferential bead 815 provided along the perimeter in the upper portion of can 813, proximate to the cap 809. The gasket 811 serves to electrically isolate cap 809 from can 813. In certain embodiments, the bead 815 on which gasket 811 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment as shown in FIG. 8B. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Further, in certain embodiments, the nickel-zinc cells employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells can have any of a number of different shapes and sizes. For example, cylindrical cells may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel zinc battery cells and appropriate casing, contacts, and conductive lines to permit charge and discharge in an electric device.

Note that the embodiment shown in FIGS. 8A and 8B has a polarity reversed of that in a conventional NiCd cell, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In certain embodiments, including that depicted in FIGS. 8A and 8B, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

Cell Can

The can is the vessel serving as the outer housing or casing of the final cell. In conventional nickel-cadmium cells, where the can is the negative terminal, it is typically nickel-plated steel. As indicated, the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel-cadmium cells, typically nickel-plated steel.

In some embodiments, the interior of the can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Electrodes-Separator Sandwich Structure

Figure 9:
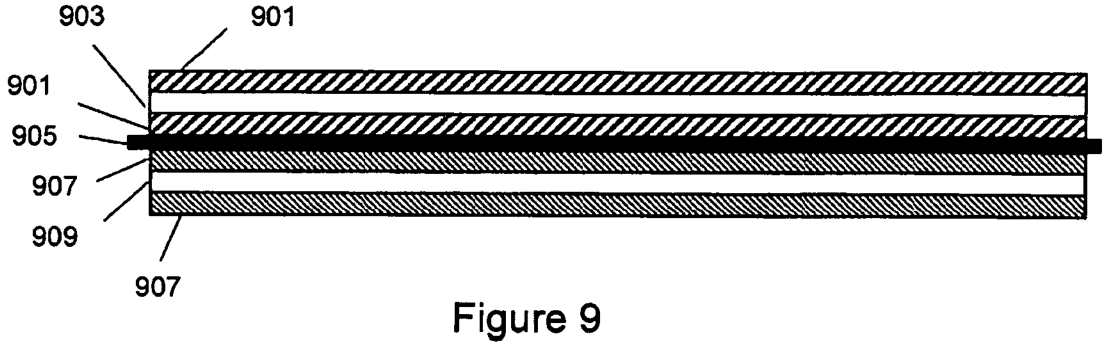
FIG. 9 illustrates the various layers in the negative electrode-separator-positive electrode sandwich structure in accordance with an embodiment of the present invention.

FIG. 9 illustrates the various layers in the negative electrode-separator-positive electrode sandwich structure before it is wound. The separator 905 mechanically separates the negative electrode (components 901 and 903) from the positive electrode (components 907 and 909) while allowing ionic exchange to occur between the electrodes and the electrolyte. The negative electrode includes electrochemically active layers 901 and an electrode substrate 903. The electrochemically active layers 901 of the zinc negative electrode typically include zinc oxide and/or zinc metal as the electrochemically active material. As explained in the Appendix, the layer 901 may also include other additives or electrochemically active compounds such as calcium zincate, bismuth oxide, aluminum oxide, indium oxide, hydroxyethyl cellulose, and a dispersant.

The electrode substrate 903 should be electrochemically compatible with the negative electrode materials 901. As described above, the electrode substrate may have the structure of a perforated metal sheet, an expanded metal, a metal foam, or a patterned continuous metal sheet.

Opposite from the negative electrode on the other side of the separator 905 is the positive electrode. The positive electrode also includes electrochemically active layers 907 and an electrode substrate 909. The layers 907 of the positive electrode may include nickel hydroxide, nickel oxide, and/or nickel oxyhydroxide as electrochemically active materials. Additives may include zinc oxide and cobalt oxide or cobalt metal as described. The electrode substrate 909 may be a nickel metal foam matrix or nickel metal sheets. Note that if a nickel foam matrix is used, then layers 907 would be absorbed in the matrix.

The Separator

A separator serves to mechanically isolate the positive and negative electrodes, while allowing ionic exchange to occur between the electrodes and the electrolyte. The separator also blocks zinc dendrite formation. Dendrites are crystalline structures having a skeletal or tree-like growth pattern ("dendritic growth") in metal deposition. In practice, dendrites form in the conductive media of a power cell during the lifetime of the cell and effectively bridge the negative and positive electrodes causing shorts and subsequent loss of battery function.

Typically, a separator will have small pores. In certain embodiments described herein, the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a preferred embodiment, the separator comprises at least two layers (and preferably exactly two layers)—a barrier layer to block zinc penetration and a wetting layer to keep the cell wet with electrolyte, allowing ionic exchange. This is generally not the case with nickel cadmium cells, which employ only a single separator material between adjacent electrode layers.

Performance of the cell may be aided by keeping the positive electrode as wet as possible and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable.

In an alternate embodiment, a single separator material may be used to block zinc penetration and to keep the cell wet with electrolyte. The single separator material may be a separator used in a conventional lithium ion cell but modified for use in the nickel zinc cell. For example, the lithium ion-type separator may be impregnated with a gel to improve its wettability characteristics. One such example is the polyethylene Teklon material available from Entek Membranes LLC, Lebanon, Oreg. This material is 20 microns thick with approximately 40% porosity. Gel may be provided to the separator directly or indirectly by, for example, be adding it to the zinc electrode.

In certain embodiments, the separator may be treated with a surfactant prior to incorporating into the anode/cathode structure. This serves to enhance the wettability and promote uniform current density. In a specific example, the separator is first treated with a solution of about 0.5-5% of a surfactant such as a Triton surfactant (e.g., X100) available from Dow Chemical Corporation of Midland Mich. The time of contact with the surfactant as well as the drying time, choice of surfactant, and concentration of surfactant are all factors that can impact the effectiveness of the treatment. Soaking for several hours in a dilute aqueous solution and subsequent air-drying can produce excellent results; additionally the use of other solvents such as methanol has been found to accelerate the uptake of the surfactant.

Another approach to rendering the micro-porous polypropylene wettable is to radiation graft specific hydrophyllic chemical groups onto the surface of the polymer. One such approach is used by Shanghai Shilong Hi-Tech Co. Ltd, Shanghai Institute of Applied Physics, Chinese Academy of Sciences. In this case the activation process is achieved using cobalt 60 irradiators.

Another consideration in the electrode/separator design is whether to provide the separator as simple sheets of approximately the same width as the electrode and currently collector sheet (e.g., FIG. 3) or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

Negative Electrode Composition

Generally the negative electrode includes one or more electroactive sources of zinc or zincate ions optionally in combination with one or more additional materials such as conductivity enhancing materials, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may comprise one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide. If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada.

The zinc active material may exist in the form of a powder, a granular composition, etc. Preferably, each of the components employed in a zinc electrode paste formulation has a relatively small particle size. This is to reduce the likelihood that a particle may penetrate or otherwise damage the separator between the positive and negative electrodes.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc. For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of hydrogen and oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Examples of corrosion inhibiting additives include cations of indium, bismuth, lead, tin, calcium, etc. Generally, these may be present in a negative electrode in the form of salts (e.g., sulfates, fluorides, etc.) at concentrations of up to about 25% by weight of a dry negative electrode formulation, typically up to about 10% by weight. In certain embodiments, organic materials may be included in the electrode formulation to inhibit corrosion of the zinc electroactive material. Examples of such inhibitors include surfactants such as commercially available Triton and RS600 surfactants.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Examples of materials that may be added to the negative electrode to improve wetting include titanium oxides, alumina, silica, alumina and silica together, etc. Generally, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Examples of materials that may be added to the negative electrode to improve electronic conductance include various electrode compatible materials having high intrinsic electronic conductivity. Examples include titanium oxides, etc. Generally, these materials are provided in concentrations of up to about 10% by weight of a dry negative electrode formulation. The exact concentration will depend, of course, on the properties of chosen additive.

Various organic materials may be added to the negative electrode for the purpose of binding, dispersion, and/or as surrogates for separators. Examples include hydroxylethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc. In a specific example, PSS and PVA are used to coat the negative electrode to provide wetting or other separator-like properties. In certain embodiments, when using a separator-like coating for the electrode, the zinc-nickel cell may employ a single layer separator and in some embodiments, no independent separator at all. In certain embodiments, polymeric materials such as PSS and PVA may be mixed with the paste formation (as opposed to coating) for the purpose of burying sharp or large particles in the electrode that might otherwise pose a danger to the separator.

Various negative electrode compositions are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

CONCLUSION

Treatment of nickel hydroxide with an alkaline solution containing persulfate oxidizing agents has unexpectedly provided performance benefits to nickel zinc cells. It is believed that that the treatment "locks" most of the cobalt into to the positive electrode prior to formation and this directly improves performance for several reasons as explained above. In addition the treatment allowed an extension of the "soak" time period (up to 24 hours) between the filling of electrolyte and the application of the first charge. The longer "soak" time improves manufacturability and product uniformity. Detrimental effects of small "soak" time variations resulting in different levels of cobalt contamination on the negative electrode are avoided. These effects may include limiting service life particularly when the cells are grouped in battery packs.

The cell performance benefits of the invention include, higher charge efficiency, higher delivered Amp hour capacity, lower self discharge, lower hydrogen gassing, lower impedance, improved battery cycle, service life, and cell-to-cell uniformity.

What is claimed is:

1. A nickel-zinc cell comprising:

(a) a zinc oxide negative electrode, (b) a nickel oxide positive electrode which comprises nickel hydroxide particles coated with cobalt oxidized to at least a valence of 3.0, and added cobalt, and (c) an alkaline electrolyte;

wherein the surface coating of the cobalt oxidized to at least a valence of 3.0 and added cobalt, together, constitute greater than about 2% by weight of the coated nickel oxide particles.

2. The nickel-zinc cell of claim 1, wherein the nickel oxide positive electrode further comprises nickel powder and binding materials.

3. The nickel-zinc cell of claim 1, wherein the cobalt oxidized to at least a valence of 3.0 has an oxidation state of about 3 to 3.25.

4. The nickel-zinc cell of claim 1, wherein the cobalt concentration in the zinc oxide negative electrode is about 5 ppm to about 30 ppm.

5. The nickel-zinc cell of claim 1, wherein the cobalt concentration in the zinc oxide negative electrode is less than about 10 ppm.

6. The nickel-zinc cell of claim 1, wherein the zinc oxide negative electrode gassing rate after formation is less than 1 ml/hr.

7. The nickel-zinc cell of claim 1, wherein the residual capacity of a fully charged cell after 28 days at 60° C. is greater than about 30% of the full capacity.

* * * * *